S. C. CROSS.
MACHINE FOR STORING EGGS.
APPLICATION FILED APR. 2, 1921.
1,434,649.
Patented Nov. 7, 1922.
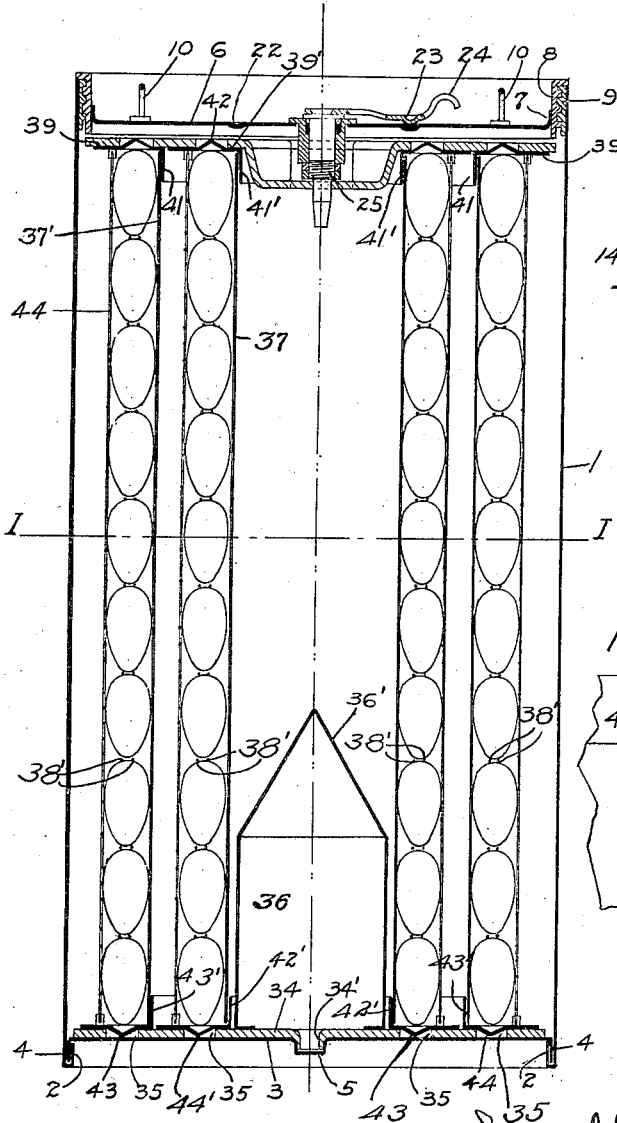
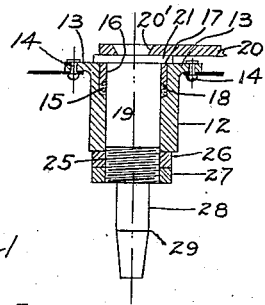
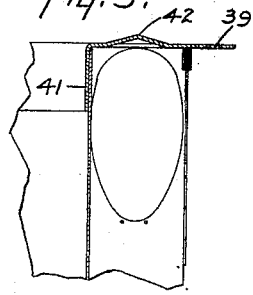

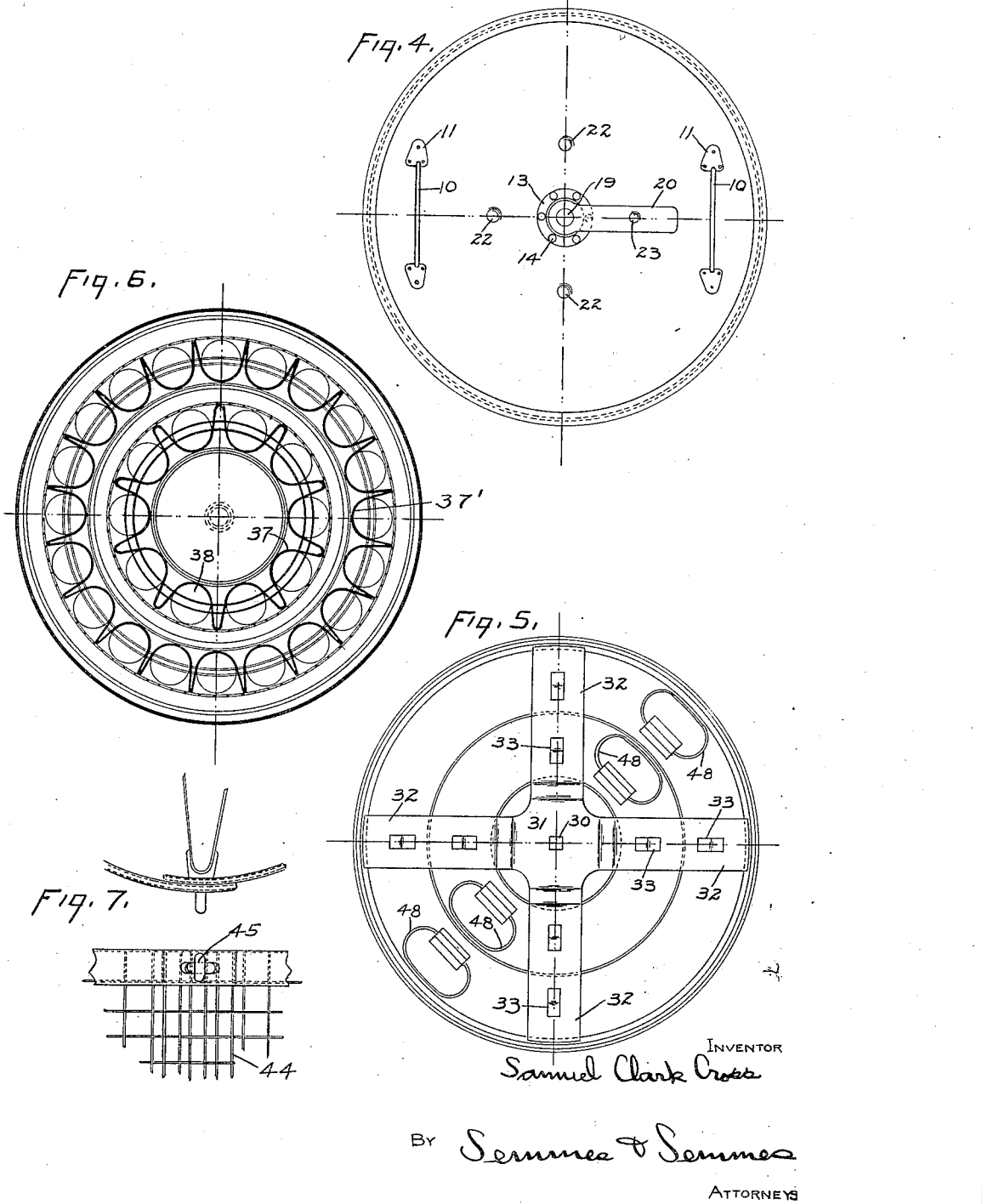

Patented Nov. 7, 1922.

1,434,649

UNITED STATES PATENT OFFICE.

SAMUEL CLARK CROSS, OF WASHINGTON, DISTRICT OF COLUMBIA.

MACHINE FOR STORING EGGS.

Application filed April 2, 1921. Serial No. 458,065.

*To all whom it may concern:*

Be it known that I, SAMUEL CLARK CROSS, citizen of the United States, residing at Washington, District of Columbia, have invented certain new and useful Improvements in Machines for Storing Eggs, of which the following is a specification.

This invention relates to certain new and useful improvements in apparatus for preserving eggs and it more particularly relates to that class of apparatus designed for the purpose of storing eggs and permitting them while so stored to be readily and easily transported without danger of breakage in transit.

One of the objects of my invention is to so design and construct my device that it will be of light weight and adapted to be readily moved about.

Another object of my invention is to provide a device which will have the advantages of high efficiency, great durability and marked simplicity as a whole, and in respect to each of its component parts so that its manufacture will be economically facilitated both as regard to the production of the individual parts and of their assembly.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a vertical cross-section view of my device.

Figure 2 is a detail view of the top bearing upon which the egg supporter pivots and is properly positioned.

Figure 3 is a detail view showing the precise construction of the egg container.

Figure 4 is a top plan view of the cover of my device.

Figure 5 is a top plan view of my device with the cover removed.

Figure 6 is a cross section taken on the line 1—1 of Figure 1.

Figure 7 is a detail of the construction of the edges of the enclosing wire mesh and of the snap fastener therefor.

Referring to the drawings, the numeral 1 represents a sheet metal container of cylindrical configuration having an annular upturned lip 2, within which fits a downturned edge 4 of the sheet metal bottom 3 which by rivets or otherwise is made to fit so tightly within said annular upturned lip so as to make a water-tight joint, and the bottom at its center part is depressed as at 5.

The top or cover 6 of the container is also made of sheet metal, the same being turned up at its upper edge as at 7 and provided with a screw threaded strengthening plate 8 adapted to engage the corresponding screw threaded strengthening plate 9 secured to the upper inner edge of the cylindrical walls 1. The upper edge of the strengthening plate 8 is extended laterally so as to cover the top of the opposite engaging screw thread strengthening plate 9 and also the top of the sheet metal container wall 1. The lower end of said plate is plain and extended downwardly beyond its opposite screw thread so that it will almost contact with the end plate to be later described.

As more clearly seen in Figure 4 the top is provided on opposite sides with handle bars 10 secured by holding plates 11 riveted or otherwise suitably secured to the top so the same may be lifted off, when desired.

The center of the top or cover is apertured and therein is fitted a bearing 12 whose upper edge is provided with an annular extension 13 which is riveted to the sheet metal top by bolts or rivets 14. The upper interior portion of this bearing is reamed out so as to provide a gland within which a packing ring 15 is placed, and above this is inserted an annular ring 16 whose upper edge is cut straight across as at 17 and whose lower edge is cut on a diagonal as at 18. Within this bearing is fitted a shaft 19 whose upper extremity is narrowed as at 20' so as to fit within one end of the lever 20, and between the lever and the top of the bearing is placed a collar 21. The top of the cover is provided with depressions 22 and the handle is provided on its under side with a downwardly projecting struck-out portion or knob 23 adapted to fit within the depressions. The remainder of the handle rising from this portion and being curved as indicated at 24 so that it may be more easily grasped and turned.

The lower portion of the shaft 19 is screw threaded as seen at 25 and secured thereon are two nuts or washers 26 and 27. Still lower down the shaft is diminished in cross section and squared as at 28, and from the point 29 is tapered towards its end and extends through a squared aperture 30 in the cross-bars of the spider as seen in Figure 5.

The construction of the cross-bars or spider is shown in Figure 5, the same consisting of a central depressed portion 31 with four radial arms 32 at a higher level. In addition there are in each arm two rectangular apertures 33, the purpose of which will later appear.

Resting on the bottom of the container is a lower spider 34, the same being provided with apertures 35, two on each side similar to the rectangular slots 33 in the upper spider having its center struck out as at 34' so as to fit within the depression 5 of the bottom and extending up from said plate and concentrically mounted with respect to the struck out portion 34' is a cylindrical sheet metal centering member 36 whose top is conically shaped as at 36', so that the egg support will easily slip over it when put in place.

There are two fluted supports 37 and 37', made of sheet metal having longitudinal depressions 38 each of the width of an egg as shown in Figure 1. Extending through each of the depressions 38 is a double row of spacing wires 38'. These wires space the eggs from one another and further prevent their breakage due to shock.

Two end plates 39 and 39' are provided to prevent the topmost of the series of eggs in each support from falling out and said plates are held in place by means of downturned flanges 41 and 41', the upper central part of each of said plates being bent into the shape of an inverted V, the point of which projects into one of the rectangular depressions 42 in the arms of the spider and holds the plate securely in place.

There are two end plates also at the bottom of the support similar to those above described save that the flanges 42' and 43' are upturned and the angularly bent portions 43 and 44' extend downwardly and fit within the slots or apertures 35.

To prevent the eggs from falling outside of the depressions in which they lie there is provided a wire mesh 44 (see Fig. 7) which forms no part of my invention. This fits around the exterior of the support in such a manner that a quarter circumference may be filled with eggs at a time when the wire is fastened by a snap fastener 45, when the next quarter circumference is filled and so on.

As seen in Figure 5 both the cylindrical supports are provided with handles 48 by means of which, after the removal of the top and the spider each of the egg supports may be removed from and returned to the container.

The cylindrical supports are removed from the container, and the eggs are placed in the compartments and the wire mesh put in place and the supports replaced in the container. Water-glass or other preserving liquid is then poured in; the end plates positioned; the spiders replaced, the top put on and the lever turned until it fits tightly within the screw threaded portion and the knob upon the bottom of the lever falls into one of the depressions in the top. A water-tight joint is effected between the interior and exterior of the container by means of the packing gland so that none of the water-glass or other preserving liquid can escape.

The apparatus is then put in a pantry or storage room upon its side and every two weeks or thereabouts the lever is given a quarter turn so that the lower lug or knob on its under side will fall into the next succeeding depression in the top. Such turn of 90° makes a sufficient change in the direction of the angle of the force of gravity to prevent the interior structure of the eggs from breaking down and consequently deteriorating.

While I have shown and described the preferred embodiment of my invention, I wish it to be understood that I do not confine myself to the precise details of construction herein set forth, by way of illustration, as it is apparent that many modifications and variations may be made therein, by those skilled in the art, without departing from the spirit of the invention, or exceeding the scope of the appended claims.

I claim as my invention:

1. In an apparatus for storing eggs, the combination with a cylindrical container, interior fluted cylindrical supports mounted therein, lower end plates upon which the supports rest, and a centering member for said supports, of a removable top, a spider below said top, an upper centering member having a packing gland extending through the top and spider, to effect a water-tight joint between the interior and exterior of the container and means to revolve said member and the supports.

2. In an apparatus for storing eggs, the combination with a cylindrical container, interior fluted supports mounted therein, lower end plates upon which the supports rest, slots in said plate into which V-shaped lugs above the fluted cylindrical supports rest and are positioned and a centering member for said supports, of a removable top, a spider below said top and an upper centering member having a packing gland extending through the top and the spider to effect a water-tight joint between the interior and exterior of the container and means to revolve said member and the supports.

3. In an apparatus for storing eggs, the combination with a cylindrical container, interior egg supports therein, lower end plates upon which the egg supports rest having V-shaped bent portions extending into notches in the lower spider, of upper end plates, an upper spider above the same, and inverted V-shaped bent portions extending into the notches in said spider to steadily hold it, of means to rotate said supports and hold them at a quarter revolution.

4. In an apparatus for storing eggs, a container, interior cylindrical supports for the eggs, lower end plates upon which said supports rest, a top for the container, a bearing in the top, an upper centering member having a packing gland therein, a spider below the top, a shaft within the bearing, one end of which extends through the spider to effect a water-tight joint between the interior and exterior of the container and means to rotate said member, the spider and the supports.

5. In an apparatus for storing eggs, the combination with a cylindrical container, interior egg supports within the container, upper and lower end plates, a cover for the container, a bearing centered therein and a shaft revolving in said bearing, of a spider comprising a depressed central portion with lateral arms extending at right angles from the center, slots in said arms, the depressed central portion being provided with an aperture through which the lower end of said shaft extends and is firmly held and means to rotate said member and the supports.

In testimony whereof I affix my signature.

SAMUEL CLARK CROSS.